UNITED STATES PATENT OFFICE.

ABRAHAM G. TESSLER, OF NEWARK, NEW JERSEY, ASSIGNOR, BY MESNE ASSIGN-
MENTS, TO NEW JERSEY PATENT COMPANY, OF WEST ORANGE, NEW JERSEY, A
CORPORATION OF NEW JERSEY.

CEMENT.

1,122,554.                Specification of Letters Patent.        Patented Dec. 29, 1914.

No Drawing.         Application filed May 4, 1910. Serial No. 559,243.

*To all whom it may concern:*

Be it known that I, ABRAHAM G. TESSLER, a citizen of Russia, and a resident of Newark, in the county of Essex and State of New Jersey, have discovered a certain new and useful Cement, of which the following is a description.

My discovery relates to a new cement and has for its object to produce a cement which may be used to secure together films of all kinds, particularly those used in the moving picture art. This cement is comparatively inexpensive, may be used with all kinds of inflammable and non-inflammable films, does not evaporate too quickly, has but little odor, makes a good union, and is transparent.

It is well known to those familiar with the moving picture art, that the films in use therein are made of different substances, such as celluloid, acetyl cellulose (cellulose acetate), and acetyl cellulose combined with gums and other substances such as camphor and the like, and that films made of celluloid are inflammable, while those made of acetyl cellulose (cellulose acetate), or acetyl cellulose combined with gums or other substances such as camphor and the like are non-inflammable. A cement which will unite efficiently all the different kinds of films, and which will not evaporate too quickly when kept on hand, has long been desired. My new cement has been found to be particularly efficient for the purpose desired and has been combined with a view to the different kinds of films with which it must be used. The proportions hereafter given are not rigidly fixed but have been found to yield excellent results and are intended to indicate in a general way desirable proportions.

A suitable base for the cement is necessary in order to form a body therefor and to replace whatever is dissolved from the two films by the solvents contained therein. About 4% base has been found satisfactory, a convenient base consisting of 3% non-inflammable film material, for example, acetyl cellulose, or acetyl cellulose combined with gums or other substances such as camphor and the like and 1% inflammable film material, for example, celluloid. As a uniting medium, a quick solvent for all kinds of films is used, as, for example, epichlorhydrin or its equivalent. Preferably, however, I use about 47% acetone and 21½% chloroform. These two substances work well together, especially when used with the other ingredients hereinafter set forth. The chloroform is necessary, where acetyl cellulose and acetone are used, in order to render the cement transparent. A further ingredient may consist of anilin or about 27% glacial acetic acid, which decreases the volatility of the above substances and has other important well known characteristics. Preferably, however, I use about 21½% glacial acetic acid and about 6% amyl acetate. The amyl acetate has a marked effect on the volatility of the other substances and disguises the disagreeable odor of the acetic acid. It will be evident to those skilled in the art that the combination of the above ingredients produces an efficient cement which may be used with all kinds of films and which produces a firm transparent joint. The particular materials set forth may be varied and some omitted or others substituted therefor, if the desired relation of the different ingredients to each other and to the articles with which the cement is to be used are maintained.

Having thus described one embodiment of my invention what I claim and desire to protect by Letters Patent is:

1. A cement composed of non-inflammable film material, inflammable film material, acetone, chloroform, glacial acetic acid and amyl acetate.

2. A cement composed of 3% non-inflammable film material, 1% inflammable film material, 47% acetone, 21½% chloroform, 21½% glacial acetic acid, and 6% amyl acetate.

3. A cementing material including celluloid, acetyl cellulose, acetone, and chloroform.

4. A cementing material including celluloid and acetyl cellulose, a solvent therefor, and chloroform.

5. A fluid cementing material including acetyl cellulose, acetone, chloroform, and a volatility decreaser.

6. A cementing material including celluloid, acetyl cellulose, acetone, chloroform, and a volatility decreaser.

7. A fluid cementing material including acetyl cellulose, a solvent therefor, chloroform, and a volatility decreaser.

8. A cementing material including celluloid and acetyl cellulose, a solvent therefor, chloroform, and a volatility decreaser.

This specification signed and witnessed this 30 day of April 1910.

ABRAHAM G. TESSLER.

Witnesses:
WARREN H. SMALL,
JOHN M. CANFIELD.